(12) United States Patent
Gardell

(10) Patent No.: US 8,559,425 B2
(45) Date of Patent: Oct. 15, 2013

(54) PARAMETERIZED TELECOMMUNICATION INTERCEPT

(75) Inventor: Steven Gardell, North Andover, MA (US)

(73) Assignee: Sonus Networks, Inc., Westford, MA (US)

( * ) Notice: Subject to any disclaimer, the term of this patent is extended or adjusted under 35 U.S.C. 154(b) by 279 days.

(21) Appl. No.: 12/979,829

(22) Filed: Dec. 28, 2010

(65) Prior Publication Data

US 2012/0163240 A1    Jun. 28, 2012

(51) Int. Cl.
*H04L 12/28*    (2006.01)
*H04L 12/56*    (2011.01)

(52) U.S. Cl.
USPC .......................................... 370/389; 370/392

(58) Field of Classification Search
USPC ......... 370/259, 242, 392, 389; 379/35, 32.01, 379/201; 455/414
See application file for complete search history.

(56) References Cited

U.S. PATENT DOCUMENTS

| | | | |
|---|---|---|---|
| 2004/0098311 A1* | 5/2004 | Nair et al. ........................ | 705/26 |
| 2007/0240208 A1* | 10/2007 | Yu et al. ........................... | 726/13 |
| 2010/0128714 A1* | 5/2010 | Kim ............................... | 370/350 |
| 2010/0142382 A1* | 6/2010 | Jungck et al. .................. | 370/242 |
| 2011/0149808 A1* | 6/2011 | Yared ............................. | 370/259 |

* cited by examiner

*Primary Examiner* — Chuong T Ho
(74) *Attorney, Agent, or Firm* — Straub & Pokotylo; Michael P. Straub; Stephen T. Straub

(57) ABSTRACT

Described are computer-based methods and apparatuses, including computer program products, for parameterized telecommunication intercept. A parameterized intercept request comprises (i) a set of intercept events for identifying a candidate telecommunication message for intercept, the set of intercept events comprising at least two of the following types of intercept events: an internet protocol event, a media event, or a signaling event, (ii) a criterion associated with the set of intercept events, and (iii) a set of intercept actions for processing the candidate telecommunication message. A first telecommunication message is received. The first telecommunication message is determined to match the set of intercept events based on the criterion. The set of intercept actions is executed based on the matched first telecommunication message.

19 Claims, 6 Drawing Sheets

PARAMETERIZED TELECOMMUNICATION INTERCEPT

FIELD OF THE INVENTION

The invention relates generally to computer-based methods and apparatuses, including computer program products, for parameterized telecommunication intercept.

BACKGROUND

Society relies heavily on various forms of telecommunication to perform everyday functions. Generally, telecommunication refers to the transmission of messages for the purpose of communication. Examples of telecommunications include telegraphs, telephones (e.g., cell phones, smart phones), text messages (e.g., MMS messages), picture messages, video messages, video chat, video conferencing, and the internet (e.g., email, instant messaging, social networking)

The ever increasing amount of telecommunication data traffic, as well as real-time communication in networks (e.g., cell networks or data networks, such as packet switched networks), has lead to a demand for intercepting such data traffic. For example, a demand exists for third parties to monitor telephone and internet telecommunications (which is often referred to as telephone tapping (or wire tapping)). The reasons for intercepting telecommunications can vary, but include countering terrorism (e.g., intercepting telecommunications that involve international terrorism as defined by 18 U.S.C. 2331), obtaining evidence to build a legal case, and/or to analyze the telecommunications.

It is further desirable to intercept telecommunications in conformity with any applicable laws, regulations, and/or ethical obligations. Legal telephone tapping by a government agency is referred to as lawful interception (LI), which is defined as obtaining communications network data pursuant to lawful authority for the purpose of analysis or evidence. Telephone tapping is often heavily regulated in many countries to safeguard an individual's privacy. For example, telephone tapping often must first be authorized by a court, and is typically only approved when evidence shows it is not possible to detect criminal or subversive activity in less intrusive ways.

Passive intercept techniques monitor and/or record the telecommunications, while active intercept techniques alter or otherwise affect it (e.g., prevents a telecommunication from being routed to its intended recipient). The telecommunications can have various attributes depending on the mode of communication, which can be used to determine which telecommunications to intercept and which telecommunications not to intercept. It is desirable to intercept telecommunications based on one or more of its associated attributes, and to process the telecommunications accordingly (e.g., passively and/or actively).

SUMMARY OF THE INVENTION

In general, parameterized intercept requests can be defined to customize which telecommunication messages are intercepted by a telecommunication intercept system. Each intercept request can include a defined set of intercept events (e.g., sender IP addresses, voice recognition, data recognition, signaling addresses) that need to be satisfied in accordance with a specified criteria (e.g., all intercept events must be satisfied, only one intercept event needs to be satisfied) before a telecommunication message is intercepted. Each intercept request can include a defined set of intercept actions (e.g., record the telecommunication message, send an alert to a third party that the telecommunication message was intercepted) that are executed for a telecommunication message that satisfies the set of intercept events.

In one aspect, the invention features a computerized method for intercepting a telecommunication message using a parameterized intercept request. The method includes storing, by a computing device, a parameterized intercept request comprising: (i) a set of intercept events for identifying a candidate telecommunication message for intercept, the set of intercept events comprising at least two of the following types of intercept events: an internet protocol event, a media event, or a signaling event, (ii) a criterion associated with the set of intercept events, and (iii) a set of intercept actions for processing the candidate telecommunication message, and receiving, by the computing device, a first telecommunication message. The method includes determining, by the computing device, that the first telecommunication message matches the set of intercept events based on the criterion. The method includes executing, by the computing device, the set of intercept actions based on the matched first telecommunication message.

In another aspect, the invention features an apparatus comprising a processor and memory for intercepting a telecommunication message using a parameterized intercept request. The apparatus includes a manager module configured to store a parameterized intercept request comprising: (i) a set of intercept events for identifying a candidate telecommunication message for intercept, the set of intercept events comprising at least two of the following types of intercept events: an internet protocol event, a media event, or a signaling event, (ii) a criterion associated with the set of intercept events, and (iii) a set of intercept actions for processing the candidate telecommunication message. The apparatus includes a data processing module in communication with the manager module configured to receive a first telecommunication message, and determine that the first telecommunication message matches the set of intercept events based on the criterion. The apparatus includes a hit manager module in communication with the manager module and the data processing module configured to execute the set of intercept actions based on the matched first telecommunication message.

In yet another aspect, the invention features a computer program product tangibly embodied in a non-transitory computer readable medium. The computer program product includes instructions being configured to cause a data processing apparatus to store a parameterized intercept request comprising: (i) a set of intercept events for identifying a candidate telecommunication message for intercept, the set of intercept events comprising at least two of the following types of intercept events: an internet protocol event, a media event, or a signaling event, (ii) a criterion associated with the set of intercept events, and (iii) a set of intercept actions for processing the candidate telecommunication message. The computer program product includes instructions being configured to cause the data processing apparatus to receive a first telecommunication message and to cause a data processing apparatus to determine that the first telecommunication message matches the set of intercept events based on the criterion. The computer program product includes instructions being configured to cause the data processing apparatus to execute the set of intercept actions based on the matched first telecommunication message.

In other embodiments, any of the aspects above, or any apparatus, device or system or method, process or technique described herein, can include one or more of the following features.

In various embodiments, the criterion comprises a criterion indicative of the parameterized intercept request requiring each of the intercept events in the set of intercept events to be satisfied by a candidate telecommunication message for the candidate telecommunication message to match the set of intercept events. Determining can include determining the first telecommunication message satisfies each intercept event in the set of intercept events.

In one or more embodiments, a state is stored for the first telecommunication message indicative of the first telecommunication message being in an inactive state, and determining includes determining the first telecommunication message satisfies a first intercept event from the set of intercept events, and updating the state for the first telecommunication message to indicate the first telecommunication message is in a pending state. Determining can include determining the first telecommunication message satisfies a remaining set of intercept events from the set of intercept events, and updating the state for the first telecommunication message to indicate the first telecommunication message is in an active state.

In one or more embodiments, the criterion includes a criterion indicative of the parameterized intercept request requiring one or more of the intercept events in the set of intercept events to be satisfied by a candidate telecommunication message for the candidate telecommunication message to match the set of intercept events. Determining can include determining the first telecommunication message satisfies a first intercept event from the set of intercept events, and not determining whether the first telecommunication message satisfies a remaining set of intercept events from the set of intercept events. A first intercept event from the set of intercept events can include an associated intercept action, and determining can include determining the first telecommunication message matches the first intercept event, and executing the associated intercept action.

In one or more embodiments, storing can include storing an XML file comprising the parameterized intercept request. The XML file can include a first element comprising a set of intercept event elements, each intercept event element corresponding to an intercept event from the set of intercept events, and a second element comprising a set of intercept action elements, each intercept action element corresponding to an intercept action from the set of intercept actions. The first element can include a tag indicative of the criterion. An intercept event element can include an associated intercept action element for the intercept event element.

In one or more embodiments, an intercept action from the set of intercept actions comprises can include an off-line intercept action, and executing the off-line intercept action can include transmitting the first telecommunication message to a data storage device. The internet protocol event can include an internet protocol address for a sender of the candidate telecommunication message, an internet protocol address for a receiver of the candidate telecommunication message, a route path for the candidate telecommunication message, or any combination thereof.

In one or more embodiments, the media event includes a set of characters in the candidate telecommunication message, a speaker identification of a voice portion of the candidate telecommunication message, a speech recognition of a set of words of the voice portion, a message type of the candidate telecommunication message, a language type of the candidate telecommunication message, an image recognition of an image portion of the candidate telecommunication message, or any combination thereof. The signaling event can include a signaling address for a sender of the candidate telecommunication message, a receiver address for an intended receiver of the candidate telecommunication message, or any combination thereof.

In one or more embodiments, determining that the first telecommunication message matches the set of intercept events based on the criterion includes determining the first telecommunication message partially matches an intercept event from the set of intercept events. An off-line analysis module can be configured to store the first telecommunication message.

The techniques, which include both methods and apparatuses, described herein can provide one or more of the following advantages. A telecommunication intercept system can implement parameterized telecommunication intercept (e.g., lawful intercept) of telecommunications originating from a network based on defined intercept requests. The intercept requests can define a set of intercept events that, if matched to a telecommunication message according to a criteria associated with the set of intercept events, can cause the telecommunication intercept system to execute a predefined set of intercept actions. The set of intercept events can be appropriately tailored to take into account various aspects of the candidate telecommunication message before performing an intercept. The associated intercept actions can only be executed, for example, if the intercept events are sufficiently triggered. Computationally expensive intercept events can be executed on stored telecommunications to increase the bandwidth and throughput of the telecommunication intercept system. Advantageously, telecommunication messages can be intercepted and used to promote national security, to build legal evidence, and/or to analyze the telecommunication messages.

Other aspects and advantages of the invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the invention, as well as the invention itself, will be more fully understood from the following description of various embodiments, when read together with the accompanying drawings.

DETAILED DESCRIPTION

Figure 1:
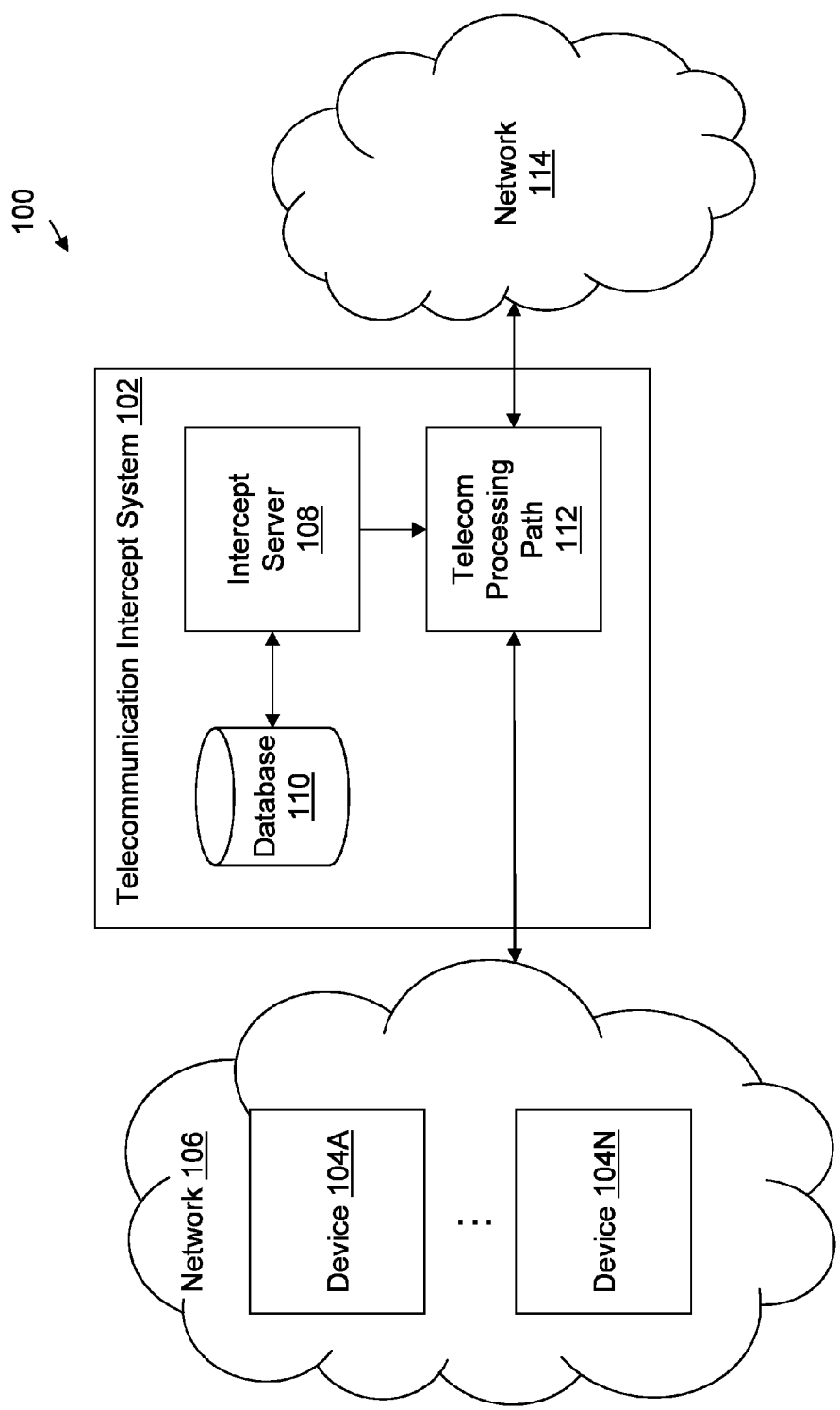
FIG. 1 illustrates an architectural diagram of a telecommunication intercept system for parameterized telecommunication intercept.

FIG. 1 illustrates an architectural diagram 100 of a telecommunication intercept system 102 for parameterized telecommunication intercept. The telecommunication intercept system 102 is in communication with a plurality of devices 104A through 104N (collectively devices 104) via network 106. The telecommunication intercept system 102 includes an intercept server 108. The intercept server 108 is in communication with database 110 and telecom processing path 112 (a data processing module). The telecommunication processing path 112 is in communication with network 114.

The telecommunication intercept system 102 can be deployed in a Voice over Internet Protocol (VoIP) network. For example, the telecommunication intercept system 102 can be deployed as a session border controller (SBC), which is a device that exerts control over the signaling and/or the media streams involved in setting up, conducting, and tearing down telephone calls or other interactive media communications. As shown in FIG. 1, the telecommunication intercept system 102 is deployed between network 106 and network 114. SBCs are often deployed, for example, on the borders between two service provider networks or between a service provider's access network and a backbone network to provide service to residential and/or enterprise customers. As an illustrative example, network 106 is a service provider's access network (e.g., for AT&T, Sprint, etc.) and network 114 is a backbone VoIP network. SBCs commonly maintain full session state and offer security functions (e.g., protection from malicious attacks, malformed packet protection, etc.), connectivity functions (e.g., protocol translations, NAT traversal, etc.), quality of service functions (e.g., traffic policing, rate limiting, call admission control, etc.), regulatory functions (e.g., emergency call prioritization, lawful interception, etc.), and media services (e.g., media transcoding, support for voice and video calls, etc.). Advantageously, the telecommunication intercept system 102 can implement parameterized telecommunication intercept (e.g., lawful intercept) of telecommunications originating from network 106 (e.g., from devices 104).

The intercept server 108 includes a processor and memory (e.g., self-contained memory such as solid state memory or a hard drive, or database 110) configured to execute parameterized intercept requests (IRs) of telecommunications. Parameterized IRs are described in further detail with reference to FIGS. 3 and 4. An exemplary embodiment of the intercept server 108 is discussed in further detail with respect to FIG. 2. One skilled in the art can appreciate that the intercept server 108 can be any computing device configured to implement the computerized methods and apparatuses described herein. Further, while FIG. 1 shows intercept server 108, database 110, and telecom processing path 112, one or more of these components (or all the components) can be combined into the intercept server 108.

The telecom processing path 112 can be, for example, a data path that processes telecommunications between network 106 and network 114. For example, the telecom processing path 112 can be a data fast path that achieves high performance of telecommunications data processing. The telecom processing path 112 can include dedicated hardware for processing the telecommunications. An exemplary embodiment of the telecom processing path 112 is discussed in further detail with respect to FIG. 2. One skilled in the art can appreciate that the intercept server can be any computing device configured to implement the computerized methods and apparatuses described herein.

The database 110 can be stored in a long term memory device (e.g., a hard drive, a redundant array of inexpensive disks (RAID), flash memory, etc.). The database 108 can be implemented using, for example, a database protocol, such as a relational database protocol (e.g., a relational database management system (RDBMS). An exemplary RDBMS is MySQL, which is implemented using the Structured Query Language (SQL). The database 110 can be implemented as a proprietary tightly-integrated data store. Advantageously, the design of database 110 need not rely on the existence of a standard external database.

Figure 2:
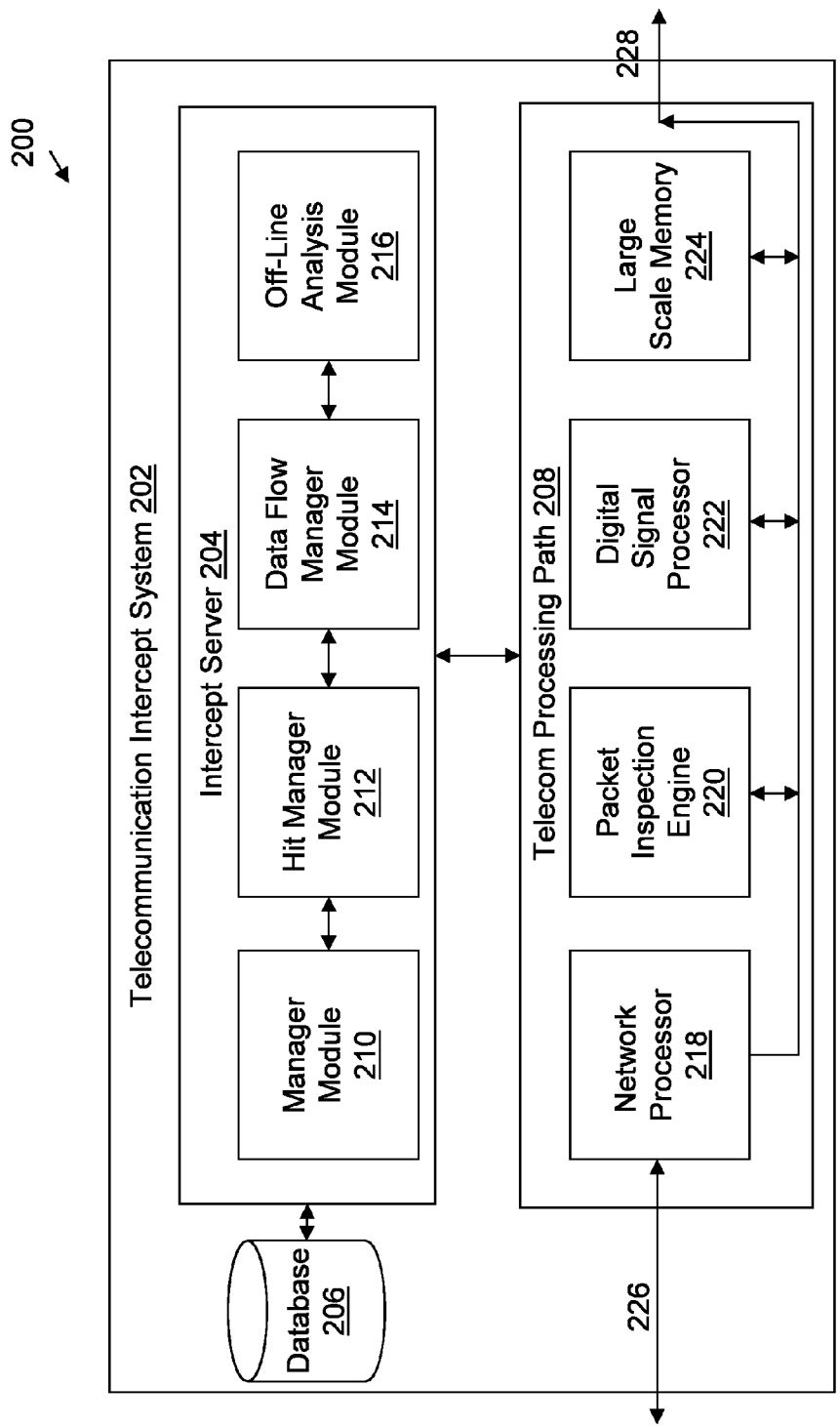
FIG. 2 illustrates an exemplary detailed architectural diagram of the telecommunication intercept system of FIG. 1.

FIG. 2 illustrates an exemplary detailed architectural diagram 200 of the telecommunication intercept system of FIG. 1. The telecommunication intercept system 202 includes an intercept server 204. The intercept server 204 is in communication with database 206 (e.g., the database 110 of FIG. 1). The intercept server 204 is also in communication with telecom processing path 208. The intercept server 204 includes a manager module 210, a hit manager module 212, a data flow manager module 214, and an off-line analysis module 216. The manager module 210 is in communication with the hit manager module 212. The hit manager module 212 is in communication with the data flow manager module 214. The data flow manager module 214 is in communication with the off-line analysis module 216. The telecom processing path 208 includes a network processor 218, a packet in section engine 220, digital signal processors 222, and large scale memory 224. The telecom processing path 208 includes a first network interface 226 (e.g., to network 106 of FIG. 1) and a second network interface 228 (e.g., to network 114 of FIG. 1). The first network interface 226 is in communication with the network processor 218. The network processor 218 is in communication with the second network interface 228. The packet inspection engine 220, the digital signal processors 222, and the large scale memory 224 can optionally process messages depending on the needs of the particular telecommunication (e.g., call). For example, the network processor 218 can receive messages from the first network interface 226, process the messages, and transmit the messages through the second network interface 228. The packet inspection engine 220, the digital signal processor 222, and the large scale memory 224 need not process the messages before the network processor 218 transmits the messages through the second network interface 228. In other examples, one or more of the packet inspection engine 220, the digital signal processors 222, and/or the large scale memory 224 process the messages before the messages are transmitted through the second network interface 228.

The database 206 maintains the parameterized intercept requests (IRs). IRs include, for example, a set of intercept events (e.g., one or more intercept events) that the telecommunication intercept system 202 uses to identify a candidate telecommunication message for intercept (e.g., the telecommunication intercept system 202 can intercept a telecommunication message based on associated internet protocol information, a media information, and/or a signaling information about the telecommunication message). The IRs also include a criterion associated with the set of intercept events (e.g., which defines how the set of intercept events need to be satisfied in order to invoke a particular IR). The IRs also include a set of intercept actions for processing the candidate telecommunication message once it is determined the candidate message satisfies the set of intercept actions.

The IRs can also include nested IRs, nested intercept events, and/or nested intercept actions. For example, an IR can have a second IR in the set of intercept actions that is executed only if the set of intercept events is satisfied (see, e.g., embedded IR 414 described with FIG. 4). As another example, an intercept event can include a nested intercept action that is executed when the intercept event is satisfied (see e.g., the speaker event 312 described with FIG. 3). The intercept event can be configured to execute the intercept action even if the set of intercept events are not be sufficiently satisfied to invoke the intercept actions of the IR. For example, if an IR is configured such that all intercept events need to be satisfied to invoke the intercept actions for an IR, then even if only the intercept with the nested intercept action is satisfied, the nested intercept action would still executes. Advantageously, various IRs can be defined to sufficiently address desired preferences (e.g., to define exactly when intercept actions are invoked, and to allow certain intercept actions to be invoked even if others are not invoked). For example, the United States government may desire to implement different levels of intercept (e.g., to only perform a second level of intercept if a first level of intercept is satisfied), which can be configured through the IRs. As another example, legal intercepts can be carefully crafted to require that a certain sequence of intercept actions be carried out based on a defined set of intercept events.

Figure 3:
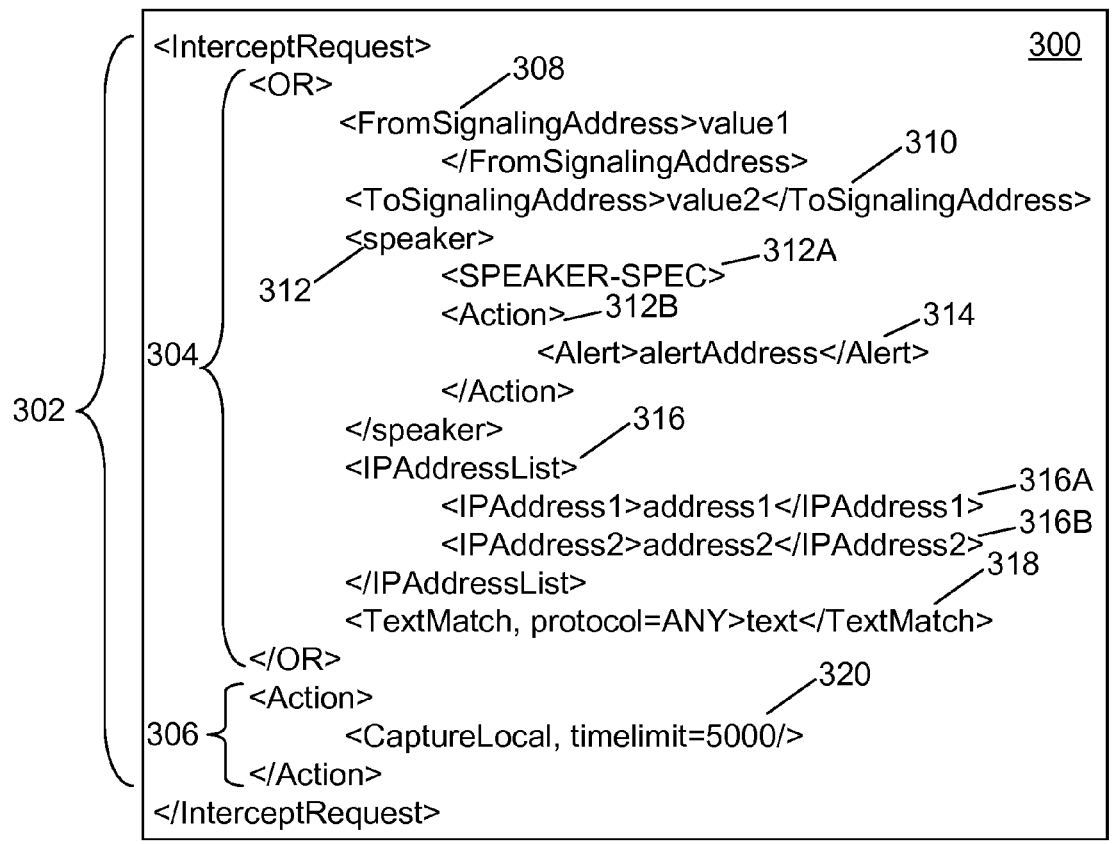
FIG. 3 illustrates an exemplary parameterized intercept request.
Figure 4:
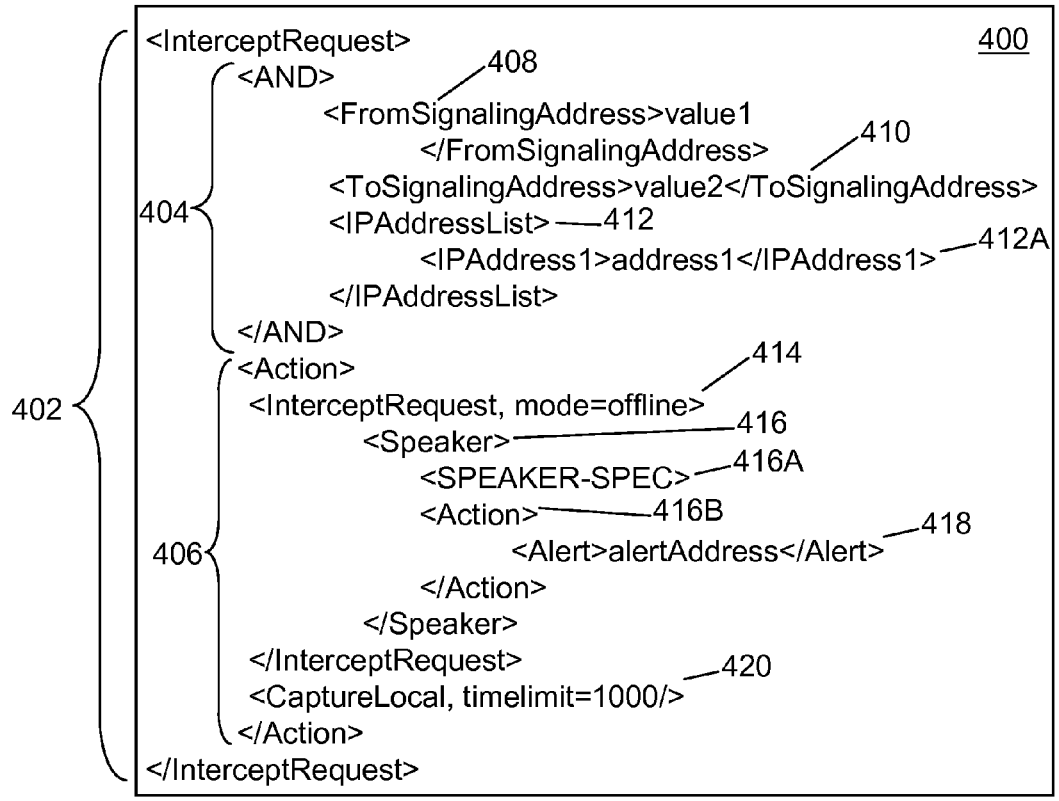
FIG. 4 illustrates an exemplary parameterized intercept request.

FIGS. 3 and 4 illustrate exemplary parameterized intercept requests. FIG. 3 illustrates IR 300, which illustrates an IR encoded in XML. The IR 300 includes the IR element 302, which begins with the start-tag <InterceptRequest> and terminates with the end-tag </InterceptRequest>. The IR element 302 includes the intercept event block 304 element and the intercept action block 306 element. The intercept event block 304 begins with the start-tag <OR> and ends with the end-tag </OR>. The intercept action block 306 begins with the start-tag <Action> and ends with the end-tag </Action>. One skilled in the art can appreciate that an IR can be encoded in XML in numerous ways other than IR 300 shown in FIG. 3 without departing from the spirit of the invention (e.g., using different types of tags, attributes, etc.).

The intercept event block 304 defines the intercept events that, if contained in or satisfied by a particular telecommunication, triggers the intercept server 204 to execute the action events listed in the intercept action block 306. The intercept event block 306 includes a tag indicative of a criterion associated with the set of intercept events. In some examples, the criterion can include a criterion indicating that the entire set of intercept events listed in the intercept event block 304 must be satisfied before the telecommunication intercept system 102 executes the set of action events listed in the intercept action block 306. For example, as is described with reference to FIG. 4, the intercept event block 306 can begin with a start-tag <AND> and terminate with an end-tag </AND>. In some examples, the criterion can include a criterion indicating that only one intercept event from the set of intercept events listed in the intercept event block 304 must be satisfied before the telecommunication intercept system 102 executes the set of action events listed in the intercept action block 306. For example, as described with reference to the intercept event block 304, the start-tag and end-tag includes an "OR." As another example, the criterion can indicate that only if one or more intercept events from the set of intercept events listed in the intercept event block 304 are not satisfied, then the telecommunication intercept system 102 executes the set of action events listed in the intercept action block 306. For example, the intercept event block 306 can begin with a start-tag <NOT> and terminate with an end-tag </NOT>. The IR 300 can also encode sequences of activities with subsequent actions dependant on the evaluation of earlier activities. For example, the IR 300 can encode a nested "if, then" block. The exemplary list of criterions is provided for illustrative purposes only. One skilled in the art can appreciate that additional programming constructs can be encoded in an IR, as well as encoded using different methods (e.g., using a numerical coding instead of an alphanumeric coding).

The intercept event block 304 includes five intercept event elements. The first intercept event is the "from" signaling address event 308, which begins with the start-tag <FromSignalingAddress> and terminates with the end-tag </FromSignalingAddress>, and has the content "value1." The "from" signaling address event 308 defines an intercept event based on the signaling address "value1" where "value1" is the signaling address associated with the sender of the telecommunication. The second intercept event is the "to" signaling address event 310, which begins with the start-tag <ToSignalingAddress> and terminates with the end-tag </ToSignalingAddress>, and has the content "value2." The "to" signaling address event 310 defines an intercept event based on the signaling address "value2," where "value2" is the signaling address associated with the intended recipient of the telecommunication.

The third intercept event in the intercept event block 304 is the speaker event 312, which begins with the start-tag <speaker> and terminates with the end-tag </speaker>, and contains two elements: the speaker element 312A and the action element 312B. The speaker element 312A is defined by the tag <SPEAKER-SPEC>. The tag <SPEAKER-SPEC> can be, for example, a placeholder for data characterizing a specific speaker. The data can be, for example, binary data. The tag <SPEAKER-SPEC> can be an encoding of the binary data, a reference to an externally configured file containing the data, and/or the like.

The action element 312B includes an alert action 314 that begins with the start-tag <Alert> and terminates with the end-tag </Alert>, and contains "alertAddress." The speaker event 312 defines an intercept event based on the speaker in a telecommunication, where the speaker element 312A defines the criteria to match the speaker, and action element 312B defines that alert action 314 is to be taken when the speaker of a telecommunication matches the speaker element 312A. Advantageously, the speaker event 312 includes an associated intercept action element (alert action 314) for the intercept event element. The associated intercept action is be executed if the particular intercept event is triggered.

The fourth intercept event in the intercept event block 304 is the IP address list event 316, which begins with the start-tag <IPAddressList> and terminates with the end-tag </IPAddressList>, and contains two elements: the first IP address element 316A and the second IP address element 316B. The first IP address element 316A begins with the start-tag <IPAddress1> and terminates with the end-tag </IPAddress1>, and includes the content "address1." The second IP address element 316B begins with the start-tag <IPAddress2> and terminates with the end-tag </IPAddress2>, and includes the content "address2." The IP address list event 316 defines an intercept event based on the IP addresses contained in the first and second IP address elements 316A and 316B.

The fifth intercept event is the text match event 318, which begins with the start-tag <TextMatch> and terminates with the end-tag </TextMatch>. The text match event 318 includes the attribute protocol which is set to the value "ANY." The text match event 318 includes the content "text." The text match event 318 defines an intercept event based on the "text" included in the tag, and defines that the text can match any protocol (e.g., SMS, on-line gaming protocols, and other protocols that can be used by a communication network).

The IR 300 identifies a set of intercept events (e.g., one or more intercept events) that triggers communication interception and identifies the set of intercept actions (e.g., one or more intercept actions) to be taken in response to the interception. The IR 300 encodes the set of intercept events through the intercept event block 304. The intercept events can include various types of intercept events, such an internet protocol events, media events, and/or signaling events. The internet protocol intercept events can include, for example, the internet protocol address for the sender of the candidate telecommunication message (i.e., the telecommunication message the telecommunication intercept system 102 is analyzing), the internet protocol address for the intended recipient of the candidate telecommunication message, a route path for the candidate telecommunication message, and/or any other IP information associated with the candidate telecommunication message. The signaling events can include a signaling address for a sender of the candidate telecommunication message, a receiver address for an intended receiver of the candidate telecommunication message, and/or any other signaling information associated with the candidate telecommunication message. For example, a signaling event can match on voice call signaling information (e.g., via lawful intercept pursuant to the Communication Assistance for Law Enforcement Act (CALEA)).

Media events can include a set of characters in the candidate telecommunication message (e.g., whether the candidate telecommunication message includes particular words or phrases in an SMS message), a speaker identification of a voice portion of the candidate telecommunication message (e.g., Mike Smith's voice for a voice telecommunication is contained within the candidate telecommunication message), a speech recognition of a set of words of the voice portion (e.g., the author of the voice communication uttered particular words or phrases), a message type of the candidate telecommunication message (e.g., SMS message, message for a VoIP call, etc.), a language type of the candidate telecommunication message (e.g., English, French, etc.), an image recognition of an image portion of the candidate telecommunication message (e.g., the image included a face of interest, an area of interest, text contained within the image), and/or the like. For example, a media event can match a word or phrase with the contents of a telecommunication message as specified via a regular expression.

These exemplary intercept events are provided for illustrative purposes only and are not intended to be exhaustive. One skilled in the art can appreciate that any type of intercept event can be encoded in an IR (e.g., intercept events for LI or for intercepts governed by other laws and/or regulations).

The intercept action block 306 includes the set of intercept actions executed by the intercept server 204 if the intercept events are satisfied for a particular telecommunication. The action block 306 includes the capture local action 320, which is defined by the tag <CaptureLocal/> and includes the attribute timelimit which is set to 5000 (e.g., 5000 seconds). The capture local action 320 defines the intercept action to record data associated with the candidate telecommunication (e.g., this and subsequent telecommunications related to the candidate telecommunication, such as those associated with a VoIP call) for the time period specified in the timelimit attribute.

The action block 306 can include other intercept actions such as, for example, a logging intercept action (e.g., log in a log file that the intercept occurred), a streaming intercept action (e.g., initiate streaming of data associated with the candidate telecommunication to an external device), triggering an alert, and/or other types of intercept actions. As an example of an alert, the hit manager module 212 can determine that the signaling and/or voice recognition of the candidate telecommunication message is indicative of a communication from a high-level terrorist, so the hit manager module 212 coordinates involvement of a human operator. As another example, an alert can be used to send an alarm to authorities (e.g., to notify law enforcement that a telecommunication is associated with illegal and/or harmful activity).

In some examples, a nested intercept event can be included in the intercept action block 306 such that the nested intercept event is only tested if the set of intercept events defined in the intercept event block 304 is satisfied (e.g., based on the associated criteria). For example, only calls from a particular range of IP addresses defined in the intercept event block 304 might be subject to speaker recognition defined in the intercept action block 306. This list of intercept action is provided for illustrative purposes only. One skilled in the art will recognize that there many other intercept actions that may be encoded in an IR.

FIG. 4 illustrates another exemplary parameterized intercept request 400. Similar to IR 300, IR 400 includes the IR element 402, which begins with the start-tag <InterceptRequest> and terminates with the end-tag </InterceptRequest>. The IR element 402 includes the intercept event block 404 element and the intercept action block 406 element. The intercept event block 404 begins with the start-tag <AND> and ends with the end-tag </AND>. The intercept action block 406 begins with the start-tag <Action> and ends with the end-tag </Action>.

The intercept event block 404 includes three intercept event elements. The first intercept event is the "from" signaling address event 408, which begins with the start-tag <FromSignalingAddress> and terminates with the end-tag </FromSignalingAddress>, and has the content "value1." The second intercept event is the "to" signaling address event 410, which begins with the start-tag <ToSignalingAddress> and terminates with the end-tag </ToSignalingAddress>, and has the content "value2." The third intercept event in the intercept event block 404 is the IP address list event 412, which begins with the start-tag <IPAddressList> and terminates with the end-tag </IPAddressList>, and contains IP address element 412A. The IP address element 412A begins with the start-tag <IPAddress1> and terminates with the end-tag </IPAddress1>, and includes the content "address1."

The intercept action block 406 includes an embedded intercept request 414 with the attribute mode set to the value "offline." The intercept request 414 includes the speaker event 416, which begins with the start-tag <Speaker> and terminates with the end-tag </Speaker>, and contains two elements: the speaker element 416A and the action element 416B. The speaker element 416A is defined by the tag <SPEAKER-SPEC>. The action element 416B includes an alert action 418 that begins with the start-tag <Alert> and terminates with the end-tag </Alert>, and contains "alertAddress." The mode "offline" indicates that the telecommunication intercept system 202 executes the intercept request 414 offline (e.g., the intercept request 114 is executed on a stored telecommunication). Advantageously, more computationally expensive intercept events can be executed on stored telecommunications that satisfy an initial set of intercept events. This can increase the bandwidth and throughput of the telecommunication intercept system 202. The intercept action block 406 also includes the capture local action 420, which is defined by the tag <CaptureLocal/> and includes the attribute timelimit which is set to 1000 (e.g., 1000 seconds).

Referring back to FIG. 2, the database 206 maintains the IRs (e.g., IR 300 and IR 400). For example, the database 206 can maintain the IRs as persistent records to enable the IRs to survive through restarts of the telecommunication intercept system 202. New IRs can be added to the database 206, and existing IRs can be removed from the database 206 (e.g., via a configuration module, not shown).

Referring to the manager module 210, the manager module 210 processes incoming IRs (e.g., incoming XML definitions). The manager module 210 manages dynamic code that is loaded into the telecom processing path 208. For example, the manager module 210 creates dynamic code based on the IRs stored in database 206. The dynamic code is loaded, as appropriate, into the network processor 218, the packet inspection engine 220, and the digital signal processors 222. The manager module 210 can also remove dynamic code associated with an IR when the IR is removed from the telecommunication intercept system 202 (e.g., when the IR is removed from the database 206).

For example, the manager module 210 can receive an incoming IR request. If the manager module 210 determines the IR request is, for example, a request to add an IR or to modify an IR, then the manager module 210 can configure the database 206 to store the IR. If the manager module 210 determines that the IR includes intercept event parameters monitored by the network processor 218, the manager module 210 can configure the network processor 218 appropriately (e.g., by adding executable code and/or by setting flags stored by the network processor) to monitor incoming telecommunications for the parameters. If the manager module 210 determines that the IR includes, for example, regular expression intercept events that define words or phrases to match with a telecommunication message, the manager module 210 can configure the packet inspection engine 220 to search incoming candidate telecommunications based on the regular expression rules. If the manager module 210 determines the IR includes a voice or video match intercept event, the manager module 210 can configure the digital signal processor 222 to monitor incoming telecommunications accordingly.

If the manager module determines the IR request is a request to delete an IR from the telecommunication intercept system 202 (e.g., to delete and/or to disable the IR), the manager module can remove the IR from the database 206. If the manager module 210 determines that the removed IR includes intercept event parameters monitored by the network processor 218, the manager module 210 can remove the associated configuration from the network processor 218. If the manager module 210 determines that the removed IR includes regular expression intercept events, the manager module 210 can remove the regular expressions from the packet inspection engine 220. If the manager module 210 determines the IR includes a voice or video match intercept event, the manager module 210 can remove the associated configurations in the digital signal processor 222.

Referring to the hit manager module 212, the hit manager module 212 integrates IR match events (or "hits") that occur in the telecom processing path 208. An IR match event is when an intercept event is satisfied by a candidate telecommunication passing through the telecom processing path 208. For example, the network processor 218, the packet inspection engine 220, and/or the digital signal processor 222 analyze a candidate telecommunication message for different properties (as described below with reference to the telecom processing path 208). If one or more components of the telecom processing path 208 determine that a candidate telecommunication message matches an intercept event, the hit manager module 212 coordinates the match events.

For example, the hit manager module 212 coordinates the match events to determine when the set of intercept events associated with one or more IRs are satisfied. If a set of intercept events is satisfied for an IR, the hit manager module 212 can coordinate execution of the set of intercept actions associated with the satisfied IR. The actions can include, for example, initiating the recording of a data stream associated with the intercepted telecommunication event onto the large scale memory 224 (e.g., record 5000 seconds of the data stream as indicated by the capture local action 320 of FIG. 1). The actions can include, for example, performing additional configuration of the network processor 218, the packet inspection engine 220, and/or digital signal processor 222 (e.g., to add further intercept events). The actions can include communicating the telecommunication message intercept to a third party. For example, the hit manager module 212 can send an alert to a third party. For example, the hit manager module 212 can send an alert indicative of the intercept to law enforcement. Exemplary law enforcement agencies include, but are not limited to, the Federal Bureau of Investigation (FBI), the United States Marshals Service (USMS), the United States Immigration and Customs Enforcement (ICE), the United States Customs and Border Protection (CBP), the Bureau of Alcohol, Tobacco, Firearms and Explosives (ATF), the Drug Enforcement Administration (DEA), the United States Secret Service (USSS), state and/or local police, military police, and foreign legal authorities (e.g., a foreign legal authority subject to US export regulations). The actions can include streaming the data stream itself, or information therein, to a third party (e.g., to law enforcement). In some embodiments, the hit manager 212 implements a finite state machine to manage the state of individual IR's, which is described with reference to FIG. 6.

Referring to the data flow manager module 214, the data flow manager module 214 manages the data communication paths for intercepted telecommunication messages (e.g., those which satisfy one or more IRs). For example, if the hit manager module 210 initiates streaming of a data stream (e.g., to the large scale memory 224 and/or to a third party), the data flow manager module 214 appropriately directs the flow of the data stream (e.g., by setting up necessary communication frameworks between the third party, by appropriately controlling data write access to the large scale memory, etc.).

The off-line analysis module 216 provides a user interface (e.g., a graphical user interface, such as a web interface) for interrogating stored telecommunication data and/or for performing additional analysis of the stored telecommunication data. Because the telecommunication data is stored (e.g., in the large scale memory 224), advantageously computationally-expensive processing can be performed on the stored telecommunication data without affecting the telecommunication processing path 208 (e.g., without any potential impact on the throughput of the telecom processing path). If appropriate, the off-line analysis module 216 can make additional use of the telecom processing path 208 elements (e.g., the network processor 218, the packet inspection engine 220, and the digital signal processor 222).

Referring to the telecom processing path 208, the network processor 218 is configured to process many streams of telecommunication data (e.g., received via the first network interface 226) in parallel with high bandwidth. The manager module 210 can configure various parameters on the network processor 218 such that the network processor 218 monitors candidate telecommunication messages for intercept events defined by IRs stored in database 206. For example, the manager module 210 can configure the network processor 218 to monitor telecommunication messages for intercept events that can be evaluated at the wire rate of the telecom processing path 208 (e.g., without compromising the throughput of the telecom processing path 208). Examples of such parameters are IP addresses (e.g., sender and/or receiver IP addresses, IP addresses of the telecommunication message hops through the network), the presence of IP-level encryption (e.g., IPSEC), identification of certain types of data flows (e.g., SIP), call signaling and/or the like.

The packet inspection engine 220 processes the data content of the telecommunication messages. The hit manager module 212 can configure the packet inspection engine 220 to examine data content of the telecommunication messages to determine if the data content satisfies intercept events that require analysis of the data content of telecommunication messages. For example, the packet inspection engine 220 can determine whether a text message includes the letters "S", "I", "P", etc. with zero or more "R"s.

The digital signal processors 222 process the media content of the telecommunication messages (e.g., voice and video). For example, the digital signal processor 222 can change the encoding of a media stream. The hit manager module 212 can configure the digital signal processor 222 to examine the media content of the telecommunication messages to determine if the media content satisfies intercept events that require analysis of the media content of telecommunication messages. For example, the digital signal processor 222 can be configured to perform speech recognition of candidate telecommunication messages.

The large scale memory 224 is dedicated storage space for the telecommunication processing path 208 and/ort he intercept server 204. For example, the data flow manager module 214 can store telecommunication data streams in the large scale memory 224. The large scale memory 224 can be of sufficient size, for example, to store hours of media (e.g., telecommunication messages) arriving at the full network speed.

Figure 5:
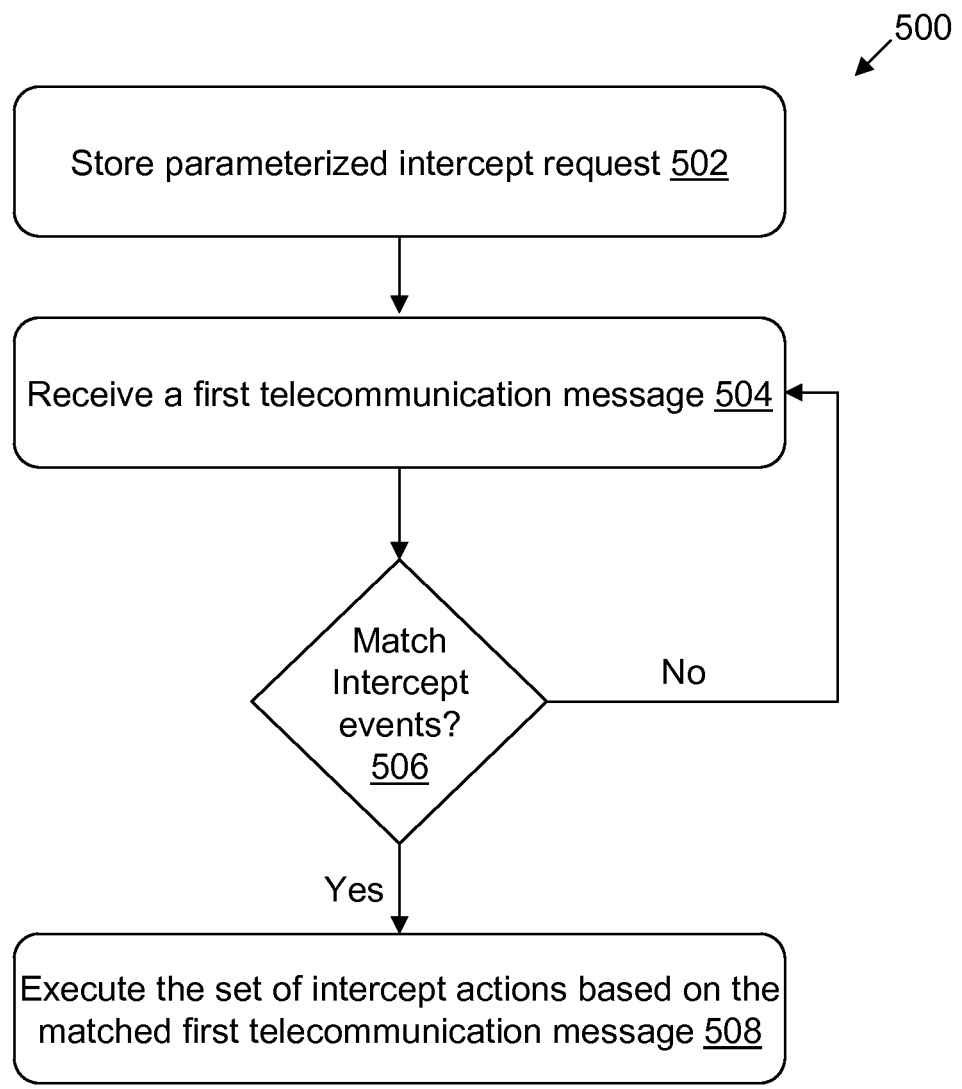
FIG. 5 is a method for intercepting a telecommunication message using a parameterized intercept request.

FIG. 5 is a computerized method 500 for intercepting a telecommunication message using a parameterized intercept request. Referring to FIG. 1, at step 502 the telecommunication intercept system 102 stores a parameterized intercept request in the database 110. At step 504, the telecommunication intercept system 102 receives a telecommunication message 504 (e.g., from a device 104). At step 506, the telecommunication intercept system 102 determines whether the telecommunication message matches the set of intercept events based on the criterion. If the telecommunication message matches the set of intercept events, the method 500 proceeds to step 508 and the telecommunication intercept system 102 executes the set of intercept actions based on the matched first telecommunication message.

Referring to step 502, the telecommunication intercept system 102 stores the IRs in the database 110. In some embodiments, each IR includes a set of intercept events for identifying a candidate telecommunication message for intercept, a criterion associated with the set of intercept events, and a set of intercept actions for processing the candidate telecommunication message. In some embodiments, the set of intercept events includes at least two of the following types of intercept events: an internet protocol event, a media event, or a signaling event (as described above with reference to FIG. 3). For example, an IR can include two intercept events. The first intercept event can be satisfied if the IP address of a candidate telecommunication message matches (or partially matches) an IP address defined by the first intercept event (e.g., an IP protocol event). The second intercept event can be satisfied if the text candidate telecommunication message matches (or partially matches) a value defined by a regular expression (e.g., a media event). Advantageously, the set of intercept events can be appropriately tailored to take into account various aspects of the candidate telecommunication message before performing an intercept.

Referring to step 506, the telecommunication intercept system 102 analyzes received telecommunication messages to determine whether the set of intercept events is satisfied for the IRs stored in the database 110. In some examples, one or more intercept events from the set of intercept events can include an associated intercept action (e.g., the speaker event 312 of FIG. 3). If the telecommunication intercept system 102 determines the first telecommunication message matches the first intercept event, then the telecommunication intercept system 102 can execute the associated intercept action. For example, if an IR includes a criterion indicating that all of the associated intercept events need to be matched in order to intercept a telecommunication message, then even if all of the intercept events are not satisfied by a telecommunication message (and therefore the telecommunication intercept system 102 does not execute the associated intercept actions), if an intercept event with an intercept action is satisfied, then the telecommunication intercept system 102 executes the intercept action.

Referring further to step 506, the telecommunication intercept system 102 can be configured to determining that a telecommunication message matches an intercept event by determining the telecommunication message partially matches the intercept event. For example, an intercept event can be configured to match a telecommunication message for all sender IP addresses from of 123.456.*.*, such that the IP addresses match as long as the first six characters are "123.456."

Referring to step 508, if the telecommunication intercept system 102 determines set of intercept events is satisfied for an IR, the telecommunication intercept system 102 executes the associated intercept actions. For example, the telecommunication intercept system 102 can store the telecommunication message, alert the authorities about the telecommunication message, transmit the telecommunication message to the authorities, and/or execute any other intercept action specified in the IR. In some embodiments, an intercept action from the set of intercept actions can include an off-line intercept action (e.g., intercept request 414 of FIG. 4). When the telecommunication intercept system 102 executes the off-line intercept action, the telecommunication intercept system 102 transmits the first telecommunication message to a data storage device and executes the off-line intercept action using the stored telecommunication message.

Referring to step 502 and FIG. 3, the intercept request 300 combines IP protocol events (e.g., IP address list event 316), signaling events (e.g., "from" signaling address event 308, "to" signaling address event 310), and media events (e.g., speaker event 312 and text match event 318). Referring to step 506, the intercept request 300 includes an "OR" condition, so the telecommunication intercept system 102 analyzes each telecommunication message and if only one intercept event is satisfied, the telecommunication intercept system 102 executes the set of intercept actions 306. Referring to step 508, the telecommunication intercept system 102 captures a stream associated with the telecommunication message locally for up to 5000 seconds. Further, if the speaker event 312 is matched, the telecommunication intercept system 102 executes the speaker action 312B.

Referring to step 502 and FIG. 4, the intercept request 400 combines IP protocol events (e.g., IP address list event 412) and signaling events (e.g., "from" signaling address event 408 and "to" signaling address event 410). The intercept request 400 includes an "AND" condition, so the telecommunication intercept system 102 analyzes each telecommunication message and only if all of the intercept events are satisfied, the telecommunication intercept system 102 executes the set of intercept actions 306. Intercept request 400 exemplifies an encoded two-phase interception. The telecommunication intercept system 102 executes the speaker event 416 on telecommunication messages only if the telecommunication message satisfies all of the intercept events. Further, the intercept request 414 is executed offline. For example, IRs can be crafted in this way for legal-privacy reasons (e.g., to prevent certain intercept events from being executed on all telecommunication messages) and/or for performance/scalability reasons for the telecommunication intercept system 102. Regardless of the result of the intercept request 414, the intercept request 400 is structured such that the stream is captured locally for up to 1000 seconds.

Figure 6:
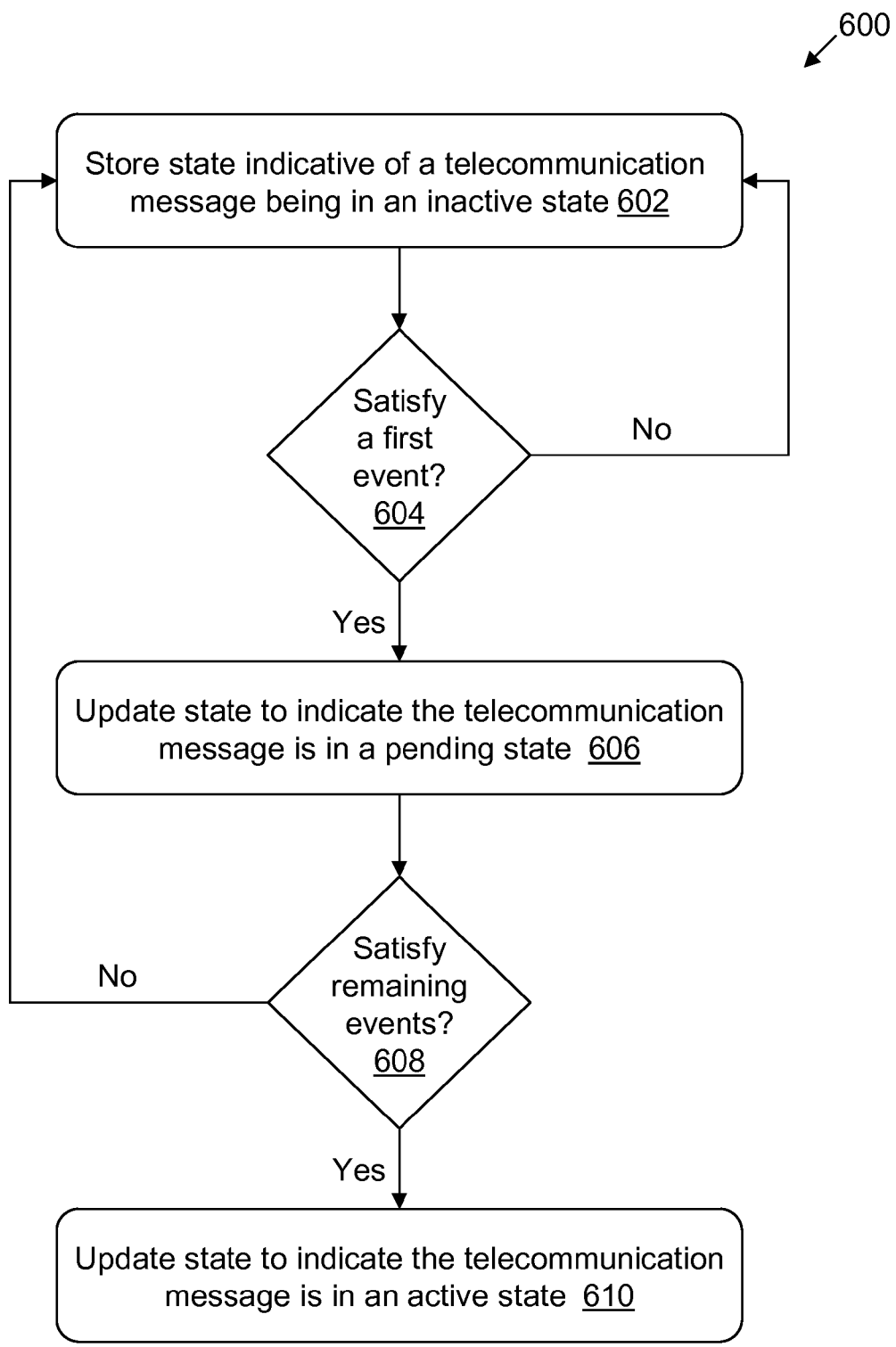
FIG. 6 is a method for parameterized telecommunication intercept wherein all rules must be satisfied.

FIG. 6 is a method 600 for parameterized telecommunication intercept wherein all rules must be satisfied. Referring to FIG. 4, the IRs can include a criterion indicative of the IR requiring each of the intercept events in the set of intercept events to be satisfied by a candidate telecommunication message for the candidate telecommunication message to match the set of intercept events (e.g., "AND"). To satisfy such a criterion, the telecommunication intercept system 102 only triggers an IR if the telecommunication intercept system 102 determines telecommunication message satisfies each intercept event in the set of intercept events. The telecommunication intercept system 102 can implement a state machine to process this and other similar conditions, as described below.

At step 602, the telecommunication intercept system 102 the telecommunication intercept system 102 stores a state for the telecommunication message indicative of the first telecommunication message being in an inactive state (e.g., before the telecommunication intercept system 102 has analyzed a telecommunication message). At step 604, the telecommunication intercept system 102 determines whether the first telecommunication message satisfies a first intercept event from the set of intercept events. If the telecommunication intercept system 102 determines the intercept event does not satisfy an intercept event, then the method 600 proceeds to step 602 (e.g., the method determines the IR is not satisfied and begins to analyze a different IR). If the telecommunication intercept system 102 determines the intercept event satisfies an intercept event, the telecommunication intercept system 102 proceeds to step 606 and updates the state for the first telecommunication message to indicate the first telecommunication message is in a pending state (e.g., that one or more intercept events matched a telecommunication message, but one or more remaining intercept events still need to be matched before the intercept actions can be executed).

At step 608, the telecommunication intercept system 102 determines whether the telecommunication message satisfies a remaining set of intercept events from the set of intercept events (e.g., whether all of the intercept events are satisfied by a telecommunication message). If the telecommunication intercept system 102 determines the remaining set of intercept events is not satisfied (e.g., one or more of the intercept events are not satisfied by the telecommunication message), the method proceeds back to step 602. If the telecommunication intercept system 102 determines the remaining set of intercept events is satisfied, the method proceeds to step 610 and the telecommunication intercept system 102 updates the state for the telecommunication message to indicate the first telecommunication message is in an active state.

Although the specification and/or figures describe(s) the techniques mostly in terms of lawful interception, these techniques work equally as well on any type of telecommunication interception. For example, these techniques can work on intercepts governed by lawful intercept authority. This can include, for example, domestic interception of communications with respect to a particular individual or organization. However, these techniques can work equally well on telecommunication intercepts that are governed by other laws and regulations. For example, the techniques can be used to monitor telecommunications at national boundaries, where such monitoring may not be legally regulated and/or may be regulated by legal authority other than that which governs lawful intercept.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method for intercepting a telecommunication message using a parameterized intercept request comprising:

storing, by a computing device, a parameterized intercept request comprising:

(i) a set of intercept events for identifying a candidate telecommunication message for intercept, the set of intercept events comprising at least two of the following types of intercept events: an internet protocol event, a media event, or a signaling event;

(ii) a criterion associated with the set of intercept events; and (iii) a set of intercept actions for processing the candidate telecommunication message;

receiving, by the computing device, a first telecommunication message;

determining, by the computing device, that the first telecommunication message matches the set of intercept events based on the criterion;

wherein said determining includes determining the first telecommunication message satisfies a first intercept event from the set of intercept events;

updating a state for the first telecommunication message to indicate the first telecommunication message is in a pending state after determining the first telecommunication message satisfies a first intercept event;

wherein said determining further includes determining the first telecommunication message satisfies a remaining set of intercept events from the set of intercept events;

updating the state for the first telecommunication message to indicate the first telecommunication message is in an active state after determining the first telecommunication message satisfies the remaining set of intercept events from the set of intercept events; and executing, by the computing device, the set of intercept actions based on the matched first telecommunication message.

2. The method of claim 1 wherein the criterion comprises a criterion indicative of the parameterized intercept request requiring each of the intercept events in the set of intercept events to be satisfied by a candidate telecommunication message for the candidate telecommunication message to match the set of intercept events.

3. The method of claim 2 wherein determining comprises determining the first telecommunication message satisfies each intercept event in the set of intercept events.

4. The method of claim 1 wherein the criterion comprises a criterion indicative of the parameterized intercept request requiring two or more of the intercept events in the set of intercept events to be satisfied by a candidate telecommunication message for the candidate telecommunication message to match the set of intercept events.

5. The method of claim 1 wherein:

an intercept event from the set of intercept events comprises an associated intercept action; and determining comprises:

determining the first telecommunication message matches said intercept event; and executing the associated intercept action after determining the first telecommunication message matches said intercept event.

6. The method of claim 1 wherein storing comprises storing an XML file comprising the parameterized intercept request, wherein the XML file comprises:
a first element comprising a set of intercept event elements, each intercept event element corresponding to an intercept event from the set of intercept events; and
a second element comprising a set of intercept action elements, each intercept action element corresponding to an intercept action from the set of intercept actions.

7. The method of claim 6 wherein the first element comprises a tag indicative of the criterion.

8. The method of claim 6 wherein an intercept event element comprises an associated intercept action element for the intercept event element.

9. The method of claim 1 wherein:
an intercept action from the set of intercept actions comprises an off-line intercept action; and
executing the off-line intercept action comprises transmitting the first telecommunication message to a data storage device.

10. The method of claim 1 wherein the internet protocol event comprises an internet protocol address for a sender of the candidate telecommunication message, an internet protocol address for a receiver of the candidate telecommunication message, a route path for the candidate telecommunication message, or any combination thereof.

11. The method of claim 1 wherein the media event comprises a set of characters in the candidate telecommunication message, a speaker identification of a voice portion of the candidate telecommunication message, a speech recognition of a set of words of the voice portion, a message type of the candidate telecommunication message, a language type of the candidate telecommunication message, an image recognition of an image portion of the candidate telecommunication message, or any combination thereof.

12. The method of claim 1 wherein the signaling event comprises a signaling address for a sender of the candidate telecommunication message, a receiver address for an intended receiver of the candidate telecommunication message, or any combination thereof.

13. The method of claim 1 wherein determining that the first telecommunication message matches the set of intercept events based on the criterion comprises determining the first telecommunication message partially matches an intercept event from the set of intercept events.

14. The method of claim 1:
wherein said set of intercept events includes a speech recognition of a set of words of a voice portion of the candidate telecommunication message, and
an internet protocol address for a sender or recipient of the candidate telecommunication message.

15. The method of claim 1:
wherein said set of intercept events includes a set of characters of the candidate telecommunication message, and
an internet protocol address for a sender or recipient of the candidate telecommunication message.

16. The method of claim 1:
wherein said set of intercept events includes an image recognition of an image portion of the candidate telecommunication message, and
an internet protocol address for a sender or recipient of the candidate telecommunication message.

17. A computerized method for intercepting a telecommunication message using a parameterized intercept request comprising:
storing, by a computing device, a parameterized intercept request comprising:
(i) a set of intercept events for identifying a candidate telecommunication message for intercept, the set of intercept events comprising at least two of the following types of intercept events: an internet protocol event, a media event, or a signaling event;
(ii) a criterion, associated with the set of intercept events, indicative of the parameterized intercept request requiring each of the intercept events in the set of intercept events to be satisfied by a candidate telecommunication message for the candidate telecommunication message to match the set of intercept events;
(iii) a set of intercept actions for processing the candidate telecommunication message;
receiving, by the computing device, a first telecommunication message;
storing a state for the first telecommunication message indicative of the first telecommunication message being in an inactive state;
determining, by the computing device, that the first telecommunication message matches the set of intercept events based on the criterion;
wherein said determining includes determining the first telecommunication message satisfies a first intercept event from the set of intercept events;
updating the state for the first telecommunication message to indicate the first telecommunication message is in a pending state after determining the first telecommunication message satisfies a first intercept event;
wherein said determining further includes determining the first telecommunication message satisfies a remaining set of intercept events from the set of intercept events;
updating the state for the first telecommunication message to indicate the first telecommunication message is in an active state after determining the first telecommunication message satisfies the remaining set of intercept events from the set of intercept events; and
executing, by the computing device, the set of intercept actions based on the matched first telecommunication message.

18. An apparatus comprising a processor and memory for intercepting a telecommunication message using a parameterized intercept request, the apparatus comprising:
a manager module configured to store a parameterized intercept request comprising:
(i) a set of intercept events for identifying a candidate telecommunication message for intercept, the set of intercept events comprising at least two of the following types of intercept events: an internet protocol event, a media event, or a signaling event;
(ii) a criterion associated with the set of intercept events; and
(iii) a set of intercept actions for processing the candidate telecommunication message;
a data processing module in communication with the manager module configured to:
receive a first telecommunication message; and
determine that the first telecommunication message matches the set of intercept events based on the criterion;
determine the first telecommunication message satisfies a first intercept event from the set of intercept events;
update a state for the first telecommunication message to indicate the first telecommunication message is in a pending state after it is determined the first telecommunication message satisfies a first intercept event;

determine the first telecommunication message satisfies a remaining set of intercept events from the set of intercept events;

update the state for the first telecommunication message to indicate the first telecommunication message is in an active state after it is determined the first telecommunication message satisfies the remaining set of intercept events from the set of intercept events; and a hit manager module in communication with the manager module and the data processing module configured to execute the set of intercept actions based on the matched first telecommunication message.

19. The apparatus of claim 18 further comprising an offline analysis module configured to store the first telecommunication message.

* * * * *